United States Patent [19]

Watanabe et al.

[11] 4,125,638

[45] Nov. 14, 1978

[54] DRY CELLS WITH STAINLESS STEEL CURRENT COLLECTOR

[75] Inventors: Jun Watanabe, Amagasaki; Akira Ohta, Hirakata; Shigeo Kobayashi, Neyagawa, all of Japan

[73] Assignee: Matsushita Electric Industrial Co., Ltd., Osaka, Japan

[21] Appl. No.: 749,275

[22] Filed: Dec. 10, 1976

[30] Foreign Application Priority Data

Dec. 18, 1975 [JP] Japan .................................. 50/151463
Dec. 29, 1975 [JP] Japan .................................. 50/159303

[51] Int. Cl.$^2$ .............................................. H01M 2/20
[52] U.S. Cl. .................................... 429/199; 429/224; 429/245
[58] Field of Search ............... 429/199, 224, 170, 169, 429/168, 167, 166, 245, 201, 178

[56] References Cited

U.S. PATENT DOCUMENTS

| | | | |
|---|---|---|---|
| 3,098,771 | 7/1963 | Huber | 429/199 |
| 3,660,167 | 5/1972 | Ching et al. | 429/170 |
| 3,773,562 | 11/1973 | Pinkowski | 429/224 |
| 3,925,101 | 12/1975 | Lehmann et al. | 429/199 |
| 3,954,505 | 5/1976 | Anderson | 429/224 |
| 4,014,712 | 3/1977 | Bryndal | 429/201 |

*Primary Examiner*—Donald L. Walton
*Attorney, Agent, or Firm*—Burgess, Ryan and Wayne

[57] ABSTRACT

Disclosed is a dry cell comprising a depolarizing mix consisting of manganese dioxide, carbon black and an electrolytic solution containing, as a major electrolyte, a neutral salt, a zinc anode and a cathode collector made of an alloy containing iron as a major component and more than 10% by weight of chromium.

7 Claims, 8 Drawing Figures

DRY CELLS WITH STAINLESS STEEL CURRENT COLLECTOR

BACKGROUND OF THE INVENTION

The present invention relates to an improvement of cathode collectors of manganese dry cells.

In prior art dry cell comprising, in combination, an electrolyte mainly consisting of ammonium chloride and/or zinc chloride, a cathode made of manganese dioxide, the cathode collector has been generally a carbon electrode or an electrically conductive plastic film containing carbon. Carbon electrodes have been used in cylindrical dry cells which have been widely used. Electrically conductive plastic films containing carbon, have been used in button-shaped dry cells, inside-out type dry cells, flat dry cells and laminated dry cells. These carbon electrodes and electrically conductive plastic films have many defects which are the major causes which have delayed the development of the dry cells. Carbon electrodes have poor air-tightness so that the atmospheric air intrudes through them into dry cells, causing corrosion of zinc and consequently reducing the shelf life. In addition, because of poor air-tightness, electrolyte leaks through carbon electrodes, cause corrosion of metal cathode caps in contact with carbon electrodes.

In the prior art button-shaped dry cells, inside-out type dry cells, flat dry cells and laminated dry cells, electrically conductive plastic films containing carbon and/or carbon compounds are used as cathode collectors, but pinholes and cracks easily form in the films. A local cell is formed through pinholes and cracks between manganese dioxide and the metal backing plate of the film which is a zinc plate in the laminated dry cells. The manganese dioxide is unnecessarily. Moreover, a metal plate upon which an electrically conductive plastic is applied is subjected to corrosion. When the metal plate is used as a shell, as in the case of inside-out and button-shaped dry cells, electrolyte leakage occurs through the corroded shell. Moreover, in dry cells wherein zinc is used as an activator, that is, in the flat dry cells, spiral dry cells and laminated dry cells wherein zinc metal is used as an anodic activator, zinc is also unnecessarily consumed.

Furthermore, when an electrically conductive plastic film containing carbon is used as a collector for manganese dioxide containing dry cells, permeation of the electrolyte due to the capilary action of the carbon in the electrode cannot be avoided completely. Thus, the above-mentioned prior art dry cells have a common defect in that their performance and shelf life are adversely affected by pinholes and cracks in the electrically conductive plastic films.

Instead of carbon cathode collectors, the use of platinum or gold which are stable up to a considerably high potential was considered. However, in practice it is out of the question to use such materials as cathode collectors because of their extremely high cost. There are available some alloys such as sterite, Hastelloy and the like are stable to manganese dioxide. However, but their hardness is extremely high so that they are difficult to machine and therefore they cannot be used as cathode collectors. As described above, the defects of the prior art cathode collectors for manganese dioxide containing dry cells may be attributed to the common fact that they are made of carbon.

SUMMARY OF THE INVENTION

One of the objects of the present invention is to substantially eliminate the adverse affects of carbon electrodes due to poor air-tightness, high permeability and formation of pinholes and cracks in electrically conductive plastic films upon the performance and shelf life of dry cells.

The inventors conducted extensive studies and experiments on alloy systems and discourse that an alloy mainly consisting of iron and chromium is stable to manganese dioxide and excellent in both ductility and machinability. The present invention is based upon the above observed fact.

Another object of the present invention is therefore to use as a cathode collector of a Leclanche dry cell, as alloy mainly consisting of iron and chromium, thereby eliminating the adverse effects on the performance and shelf life from poor air-tightness of carbon electrodes and pinholes and cracks in electrically conductive films or foils of the prior art dry cells.

An alloy in accordance with the present invention which is used as a cathode collector, mainly consists of iron and contains at least more than 10% by weight of chrominum. With the content of chromium less than 10% by weight, such an alloy is easily susceptible to corrosion when brought into contact with manganese dioxide. However, a cathode collector which is very stable and has excellent resistance to corrosion may be made of an alloy mainly consisting of iron and containing at least more than 10% by weight of chromium. Furthermore, when both or either of 0.5 to 3% by weight of molybdenum and 2 to 15% by weight or nickel are added, a more stable cathode collector may be provided. An alloy in accordance with the present invention retains the inherent qualities of iron and exhibits excellent ductility and machinability. The alloy may be easily rolled into a thin sheet from which are drawn not only cylindrical cases for button and inside-out dry cells, which also serve as cathode collectors, but also case in suitable shapes for flat, spiral and laminated dry cells.

DESCRIPTION OF THE PREFERRED EMBODIMENTS

Figure 1:
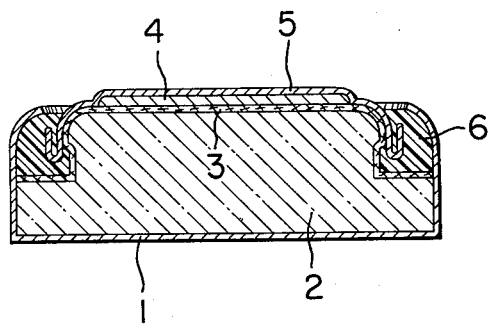
FIG. 1 is a sectional view of a button dry cell to which is applied the present invention.

In FIG. 1 there is shown in cross section a button dry cell wherein an alloy in accordance with the present invention is used as a cathode collector. More specifically, the cathode collector 1 which also serves as an outer case or shell is made of an alloy consisting mainly of iron and containing 14% by weight of chromium. A depolarizing mix or core 2 directly filled in the shell consists of a black mix consisting of manganese dioxide mixed with carbon black and an electrolyte, and a separator 3 is placed on the top of the depolarization core 2 and an anode or zinc plate 4 is placed over the separator 3. The top of the shell 1 is sealed with a metal top or anode collector 5 which is electrically isolated from the shell with an insulating ring 6 made of a plastic or the like.

Figure 2:
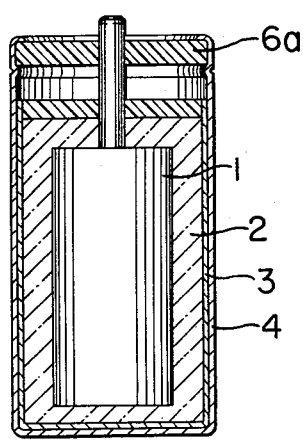
FIG. 2 is a sectional view of a cylindrical dry cell to which is applied the present invention.

In FIG. 2 there is shown in cross section a cylindrical dry cell to which is applied the present invention. The cathode collector 1 is placed in the depolarizing mix 2 which is filled in the zinc plate shell 4 and is separated therefrom with the separator 3. The zinc shell 4 is sealed with a top sealing member 6a.

Figure 3:
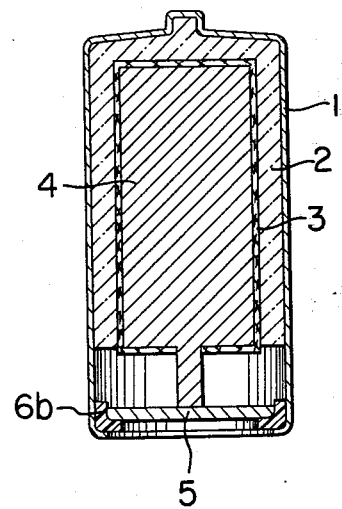
FIG. 3 is a sectional view of an inside-out dry cell to which is applied the present invention.

In FIG. 3 there is shown in cross section an inside-out type dry cell to which is applied the present invention. The depolarizing mix 2 is filled in the shell or cathode collector 1 in accordance with the present invention, and zinc anode 4 is placed in the depolarizing mix 2 and separated therefrom by the separator 3. The anode collector or terminal 5 is electrically brought into contact with the zinc electrode 4 and is electrically isolated from the shell 1 with a sealing member 6b and serves also as a bottom seal.

Figure 4:
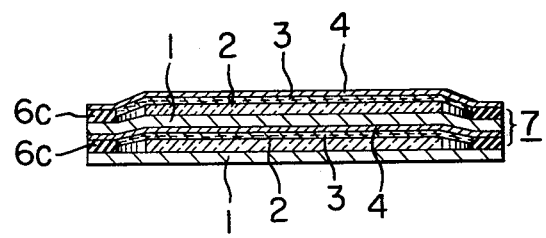
FIG. 4 is a sectional view of a flat dry cell to which is applied the present invention.

In FIG. 4 there is shown in cross section a flat dry cell to which is applied the present invention. The bottom of the cell consists of the cathode collector 1 upon the top surface of which is formed a lower depolarizing mix layer 2 over which is placed a lower separator 3. Placed over the lower separator 3 is a clad metal 7 consisting of an alloy cathode collector and a zinc plate, and an upper depolarizing mix layer 2 is formed over the top surface of the clad metal 7, and an upper separator 3 is placed over the upper mix layer. Placed over the upper separator 3 is an anode zinc plate 4 which is electrically isolated from clad metal 7 with an electrically insulating adhesive 6c. The clad metal 7 is also electrically isolated from the cathode collector 1 with the adhesive 6c. When two flat dry cells of the type shown FIG. 4 are connected in series, the clad metals 7 are used as connectors between them.

Figure 5:
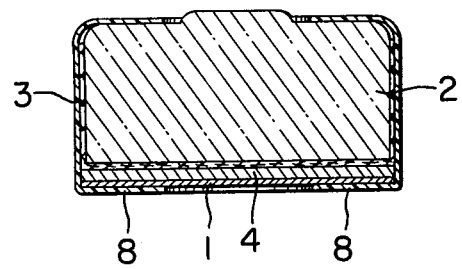
FIG. 5 is a sectional view of a laminated dry cell to which is applied the present invention.

In FIG. 5 there is shown in cross section a primary cell of a laminated dry cell consisting of the cathode collector 1, the depolarizing mix 2, the separator 3, the anode zinc plate 4 and an outer tube 8 made of a thermally shrinkable material.

As described above, the alloys in accordance with the present invention may find wide applications as cathode collectors in the dry cells of the type using manganese dioxide.

The cathode collectors in accordance with the present invention may be also used in the dry cells of the type using an electrolyte consisting mainly of ammonium chloride and/or zinc chloride. They may be also used in the manganese dioxide dry cells of the type using an electrolyte consisting mainly of zinc perchlorate, but more stable operation may be ensured when used in manganese dioxide dry cells. That is, corrosion of cathode collectors may be minimized when they are used in an electrolyte wherein the anion is a chloride ion rather than when they are used in an electrolyte wherein anion is perchlorate ion.

As cathode collectors, various stainless steels may be used. For instance, they are austenitic stainless steels containing more than 3% and more preferably 12% by weight of nickel and more than 16% by weight of chromium, and they are designated by the American Iron and Steel Institute as types AISI 201, 202, 301, 302, 304, 304L, 305, 309S, 310S, 321, 347 and so on. Moreover, stainless steels such as AISI 316, 316L and 317 containing more than 1% by weight of molybdenum may be used.

Ferritic stainless steels containing more than 10% by weight of chromium may be also used. They are, for instance, AISI 405, 429 and 430. In addition, AISI 434 may be used which contains more than 0.5% by weight of molybdenum.

Martensitic stainless steels containing more than 10% by weight of chromium may be used. They are, for instance, AISI 403 and 410.

The above-mentioned stainless steels have excellent resistance to corrosion as a cathode collector by manganese dioxide in an electrolyte wherein the anion is a perchlorate ion. When used as a cathode collector in a manganese-dioxide dry cell using an electrolyte consisting of, for example, ammonium chloride and zinc chloride wherein the anion is a chloride ion, a stainless steel containing more than 30% by weight of chromium and more than 2% by weight of molybdenum has excellent resistance to corrosion and a longer shelf life.

In dry cells of the type using an electrolyte wherein the anion is a chloride ion, the types of cathode collectors are limited. It is preferable to use stainless steels as a cathode collector containing more than 30% by weight of chromium and about 2% by weight of molybdenum without containing nickel. However, in dry cells of the type using an electrolyte wherein the anion is a perchlorate ion, stainless steels containing more than 10% by weight of chromium may be satisfactorily used.

Figure 6:
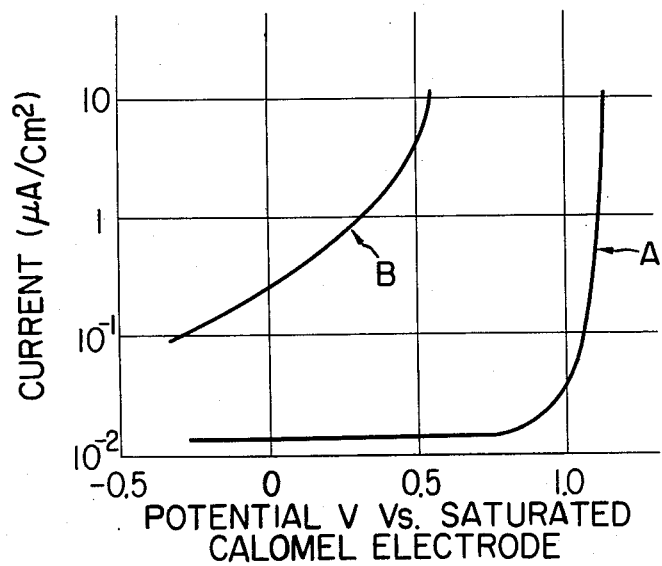
FIG. 6 shows cathodic polarization curves with a potential versus a saturated calomel electrode plotted along the abscissa and a current, along the ordinate.

FIG. 6 is a graph illustrating how stable a cathode collector in accordance with the present invention is in a manganese dioxide cell of the type using an electrolyte consisting substantially of zinc perchlorate. Potential versus the saturated calomel electrode SCE is plotted along the abscissa whereas current, along the ordinate when zinc chloride concentration is 30% by weight. A cathodic polarization curve A shows the present invention or is that of an alloy containing 68% by weight of iron, 30% by weight of chromium and 2% by weight of molybdeum. A curve B indicates cathodic polarization of an alloy containing 91% of iron and 9% by weight of chromium only. It is seen that an alloy having a composition in accordance with the present invention is significantly stable at 0.6V and that even at less than 0.6V passive current is considerably smaller as compared with the curve B. Thus, an alloy in accordance with the present invention exhibits excellent characteristics as a cathode collector for a manganese dioxide dry cell.

Figure 7:
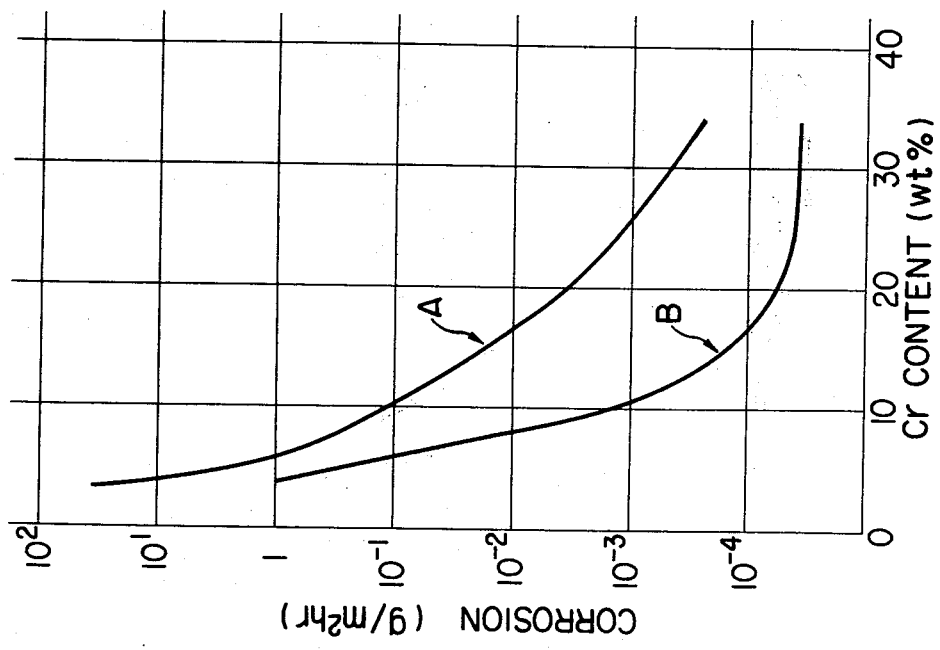
FIG. 7 is a graph illustrating the dependence of corrosion of iron-chromium alloys on the content of chromium.

FIG. 7 shows the comparison of stability or corrosion between a cathode collector in an electrolyte containing a chloride ion and a cathode collector in an electrolyte containing a perchlorate ion and the dependence of corrosion on a content of chromium in % by weight. Curve A indicates the corrosion rate in a solution containing 20% by weight zinc chloride whereas curve B illustrates the corrosion rate in a solution containing 20% weight of zinc perchlorate. It is clearly seen that the lower the chromium content, the faster the corrosion occurs. In addition to chromium, other elements may be added in order to improve the resistance to corrosion. For instance, a stainless steel containing 20% by weight of chromium and 3% by weight of molybdenum or stainless steel containing 16% by weight of chromium, 12% by weight of nickel and 3% by weight of molybdenum has increased resistance to corrosion. From FIG. 7, it is also seen that the cathode collectors are less subject to corrosion in the zinc perchlorate solution than in the zinc chloride solution. Moreover, it is seen that a stainless steel cathode collector used with the zinc chloride solution (A) must contain at least more than 20% by weight of chromium whereas a cathode collector used in the zinc perchlorate solution (B) must contain at least more than 10% by weight of chromium.

Figure 8:
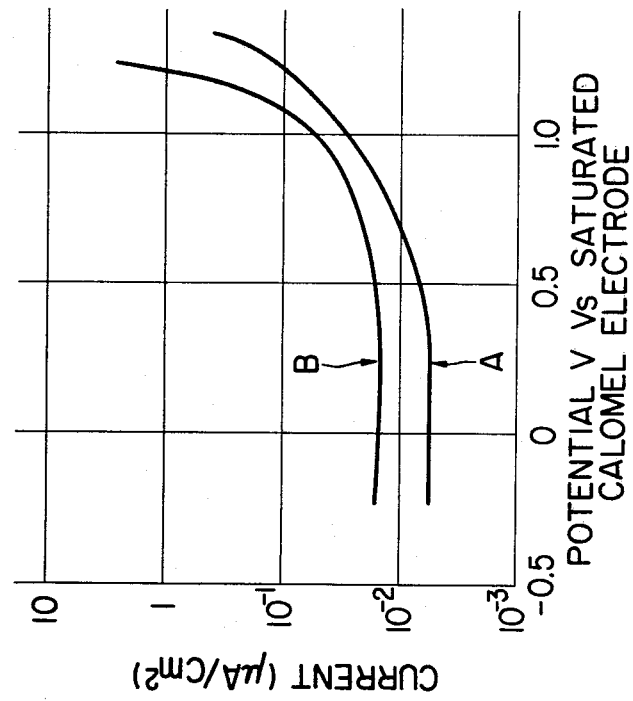
FIG. 8 shows cathodic polarization curves A and B of cathode collectors in accordance with the present invention in zinc perchlorate and zinc chloride solutions, respectively.

FIG. 8 shows cathodic polarization curves similar to FIG. 6. Curve A shows cathodic polarization of a stainless steel containing 28% by weight of chromium and placed in a solution containing 30% by weight of zinc perchlorate, whereas curve B illustrates cathodic polarization curves, of an alloy containing 72% by weight of iron and 28% of chromium when it is placed in a solution containing 30% by weight of zinc chloride.

From FIG. 8, it is seen that the cathode collector in accordance with the present invention is more stable at 0.6V in the zinc perchlorate solution and that passive current is considerably smaller as compared with the curve B. Therefore, a cathode collector in accordance with the present invention is extremely stable in an electrolyte containing zinc perchlorate in a manganese dioxide cell.

The advantages and features attained when an alloy in accordance with the present invention is used as a cathode collector, may be summarized as follows:

(a) Opposed to carbon electrodes, a cathode collector of the present invention has complete air-tightness or no permeability so that it is completely free from the adverse effects of the surrounding atmosphere.

(b) Leakage of electrolyte from a cell hardly occurs so that, opposed to the prior art dry cells of the type using carbon electrodes, corrosion of a cathode cap may be completely prevented.

(c) Instead of an electrically conductive plastic film, an alloy of the present invention may be advantageously used to prevent the degradation of performance due to pinholes and cracks in the plastic film.

(d) When an alloy containing iron as a major component and at least more than 10% by weight of chromium is used as a cathode collector, shelf life may be remarkably increased as compared with the prior art dry cells of the type having carbon electrodes.

(e) In the prior art dry cells of the type using electrically conductive plastic films, the latter must be supported on metal plates. However, an alloy of the present invention may have a double function as a cathode collector and as an outer shell so that a supporting metal may be eliminated and consequently materials may be saved and fabrication steps may be reduced. Moreover, an alloy of the present invention has sufficient ductility and plasticity so that it may be easily formed in any form such as a can, a thin plate or the like.

What is claimed is:

1. A dry cell comprising
   (a) a depolarizing mix consisting essentially of manganese dioxide, carbon black and zinc perchlorate as an electrolyte,
   (b) an anode made of zinc, and
   (c) a cathode collector made of an alloy containing iron as a major component and more than 10% by weight of chromium.

2. A dry cell as set forth in claim 1 wherein the electrolyte is zinc perchlorate, and said cathode collector is made of an alloy containing iron as a major component and more than 10% by weight of chromium and 0.5 to 3% by weight of molybdenum.

3. A dry cell as set forth in claim 1 wherein said cathode collector is made of an alloy containing iron as a major component, more than 10% by weight of chromium, 2 to 15% by weight of nickel and 0.5 to 3% by weight of molybdenum.

4. A dry cell as set forth in claim 1 wherein said cathode collector is made of an alloy containing iron as a major component, about 30% by weight of chromium and 2% by weight of molybdenum.

5. A dry cell as set forth in claim 1 wherein said cathode collector is made of an alloy containing iron as a major component, more than 16% by weight of chromium and more than 3% by weight of nickel.

6. A dry cell as set forth in claim 2 wherein said cathode collector is made of an alloy containing iron as a major component and about 20% by weight of chromium and about 2% by weight of molybdenum.

7. A dry cell as set forth in claim 3 wherein said cathode collector is made of an alloy containing iron as a major component, about 16% by weight of chromium, about 12% by weight of nickel and about 3% by weight of molybdenum.

* * * * *

UNITED STATES PATENT OFFICE
CERTIFICATE OF CORRECTION

Patent No. 4,125,638        Dated November 14, 1978

Inventor(s) Jun Watanabe, et al

It is certified that error appears in the above-identified patent and that said Letters Patent are hereby corrected as shown below:

Column 1, line 61: "some" should be cancelled

Column 2, line 10: "discourse" should be --discovered-- line 17: "as" (2nd occurrence) should be --an-- line 44: "case" should be --cases--

Column 4, line 4 : "anion is" should be --the anion is a -- line 56: "0.6V" (1st occurrence) should be --+0.6V--

Column 6, line 38 : "2%" should be --about 2%--.

Signed and Sealed this

Twenty-ninth Day of May 1979

[SEAL]

Attest:

RUTH C. MASON
Attesting Officer

DONALD W. BANNER
Commissioner of Patents and Trademarks